United States Patent
Laskoski

(10) Patent No.: US 9,932,455 B2
(45) Date of Patent: Apr. 3, 2018

(54) POROUS POLYMER SUPPORTED POLOXOMETALATES

(71) Applicant: Matthew Laskoski, Springfield, VA (US)

(72) Inventor: Matthew Laskoski, Springfield, VA (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 118 days.

(21) Appl. No.: 14/824,112

(22) Filed: Aug. 12, 2015

(65) Prior Publication Data
US 2015/0344665 A1    Dec. 3, 2015

Related U.S. Application Data

(62) Division of application No. 13/623,194, filed on Sep. 20, 2012, now Pat. No. 9,126,185.

(Continued)

(51) Int. Cl.
*C08J 9/36*      (2006.01)
*B01J 23/30*     (2006.01)
(Continued)

(52) U.S. Cl.
CPC .......... *C08J 9/36* (2013.01); *A62D 3/30* (2013.01); *A62D 3/38* (2013.01); *B01J 23/28* (2013.01); *B01J 23/30* (2013.01); *B01J 27/188* (2013.01); *B01J 27/199* (2013.01); *B01J 35/002* (2013.01); *B01J 37/0209* (2013.01); *B01J 37/031* (2013.01); *C08G 73/0694* (2013.01);
(Continued)

(58) Field of Classification Search
CPC .......... B01J 27/188; C01G 39/006; C08J 9/36; C08J 9/40
See application file for complete search history.

(56) References Cited

U.S. PATENT DOCUMENTS

2003/0072811 A1* 4/2003 Hill .......................... A62D 3/30
                                                                    424/618

OTHER PUBLICATIONS

K.H. Wu, P.Y. Yu, C.C. Yang, G.P. Wang, C.M. Chao. Preparation and characterization of polyoxometalate-modified poly(vinyl alcohol)/polyethyleneimine hybrids as a chemical and biological self-detoxifying material. Polymer Degradation and Stability 94 (2009) 1411-1418.*

(Continued)

*Primary Examiner* — Michael M Dollinger
*Assistant Examiner* — Christina H Wales
(74) *Attorney, Agent, or Firm* — US Naval Research Laboratory; Rebecca L. Forman

(57) ABSTRACT

A composition for the destruction of chemical warfare agents and toxic industrial chemicals having a polyoxometalate (POM) attached to an amine, carboxylic acid, or ammonium substituted porous polymer. Also disclosed is a method for attaching a POM to an amine, carboxylic acid, or ammonium substituted porous polymer by (1) dissolving the POM in water or an organic solvent, adding the functionalized porous polymer, whereby the POM ionically attaches to the amine, carboxylic acid or ammonium group, or (2) heating the POM and functionalized polymer in the presence of a dehydrating agent whereby an imide bond is produced between the POM and the functionality on the porous polymer.

8 Claims, 4 Drawing Sheets

POM

Functionalized porous polymer

POMs attached to polymer beads

Related U.S. Application Data

(60) Provisional application No. 61/541,151, filed on Sep. 30, 2011.

(51) Int. Cl.

| | | |
|---|---|---|
| *B01J 27/188* | (2006.01) | |
| *C08G 73/06* | (2006.01) | |
| *C08L 79/02* | (2006.01) | |
| *A62D 3/38* | (2007.01) | |
| *B01J 37/03* | (2006.01) | |
| *B01J 23/28* | (2006.01) | |
| *B01J 27/199* | (2006.01) | |
| *B01J 35/00* | (2006.01) | |
| *B01J 37/02* | (2006.01) | |
| *A62D 3/30* | (2007.01) | |
| *A62D 101/02* | (2007.01) | |

(52) U.S. Cl.
CPC .......... *C08L 79/02* (2013.01); *A62D 2101/02* (2013.01); *C08J 2325/06* (2013.01); *C08J 2345/00* (2013.01)

(56) References Cited

OTHER PUBLICATIONS

Turek, W.; Lapkowski, M.; Pron, A.; Debiec, J.; Wolna, A.; Domagala, W. Heteropolyacids Dispersed within a polymer matrix as a new catalytic systems with controlled oxidative-reductive and acid-base active centers. Macromol. Symp. 2004, 210, 281-289.*

Nelya M. Okun, Michelle D. Ritorto, Travis M. Anderson, Robert P. Apkarian, and Craig L. Hill. Polyoxometalates on Cationic Silica Nanoparticles. Physicochemical Properties of an Electrostatically Bound Multi-Iron Catalyst. Chem. Mater. 2004, 16, 2551-2558.*

Ye Shi, Lele Peng, Yu Ding, Yu Zhao and Guihua Yu "Nanostructured conductive polymers for advanced energy storage" Chem. Soc. Rev., 2015, 44, 6684-6696.*

* cited by examiner

POROUS POLYMER SUPPORTED POLOXOMETALATES

PRIORITY CLAIM

This Application is a divisional application of U.S. patent application Ser. No. 13/623,194 filed on Sep. 20, 2012 by Matthew Laskoski, entitled "POROUS POLYMER SUPPORTED POLYOXOMETALATES," which claimed priority from U.S. Provisional Application No. 61/541,151 filed on Sep. 30, 2011 by Matthew Laskoski, entitled "POROUS POLYMER SUPPORTED POLYOXOMETALATES," the entire contents of each are incorporated herein by reference.

BACKGROUND OF THE INVENTION

Field of the Invention

The present invention relates generally to polyoxometalates and, more specifically, to polyoxometalates attached to porous polymer substrates.

Description of the Prior Art

Polyoxometalates (POMs) have been used as oxidation, polymerization, and hydration catalysts for over 20 years. They have a very strong acidity approaching the superacid region, and are efficient oxidants, exhibiting fast reversible multi-electron redox transformations under mild conditions (Kozhevnikov, *Chem. Rev.*, 98,171-198 (1998)). These properties are advantageous for the catalytic destruction of chemical warfare agents (CWAs) and toxic industrial chemicals (TICs). For instance, the $Fe^{III}[H(ONO_2)_2]PW_{11}O_{39}^{5-}$ (POM) is known for its aerobic catalytic oxidation of HD (sulfur mustard) (Okun et al., *J. of Mol. Cat. A: Chem.*, 246, 11-17 (2006)). The real-world performance of POMs for such applications, however, is often limited by the low surface areas of typical solid-state forms of this material, resulting in poor catalyst utilization. This limitation can be overcome by suspending the POMs into a polymer matrix. Unfortunately, the inability of the POM to stay suspended in the polymer over time leads to unpredictable catalytic activity. Such effects as mechanical strength and thermal and chemical stability are often difficult to realize by simple doping of POMs into polymer matrices. The current research is focused on maintaining the innate catalytic properties of POMs in the solid state after attaching POMs to a porous polymer. Covalently or ionically bound POMs will limit inherent aggregation while preserving long-term stable catalytic activity representative of the parent POM, with the added benefit of the polymer backbone which will allow the formation of films, coatings and composites.

BRIEF SUMMARY OF THE INVENTION

The present invention provides a composition for the destruction of chemical warfare agents and toxic industrial chemicals having a polyoxometalate (POM) attached to an amine, carboxylic acid, or ammonium substituted porous polymer. Also disclosed is a method for attaching a POM to an amine, carboxylic acid, or ammonium substituted porous polymer by (1) dissolving the POM in water or an organic solvent, adding the functionalized porous polymer, whereby the POM ionically attaches to the amine, carboxylic acid, or ammonium group, or (2) heating the POM and functionalized polymer in the presence of a dehydrating agent whereby an imide bond is produced between the POM and the functionality on the porous polymer.

The purpose of this invention is: (1) composition of matter identified as a polyoxometalate attached to a porous organic polymer substrate; and (2) general synthetic procedures for preparation of this class of material from a functionalized porous organic polymer and various inorganic polyoxometalates. Interest in such compositions of matter is driven primarily by highly active oxidation catalysts for use in the air based destruction of chemical warfare agents (CWAs) and toxic industrial chemicals (TICs).

These and other features and advantages of the invention, as well as the invention itself, will become better understood by reference to the following detailed description, appended claims, and accompanying drawings.

DETAILED DESCRIPTION OF THE INVENTION

The present invention provides a new composition of matter (and corresponding method of preparation) for previously unknown functional materials that can be employed as oxidation catalysts for the destruction of CWAs or TICs. These new high surface area POM-containing polymeric materials have better performance toward catalytic oxidation reactions when compared to unsupported POMs with the added benefit of having them permanently attached on a lightweight, processable polymer substrate. The materials of the present invention are the first described for the attachment of a polyoxometalate to a porous organic polymer substrate functionalized with amine, carboxylic acid, or ammonium groups. Another chief advantage of this procedure is that is scalable to large quantities.

Figure 1:
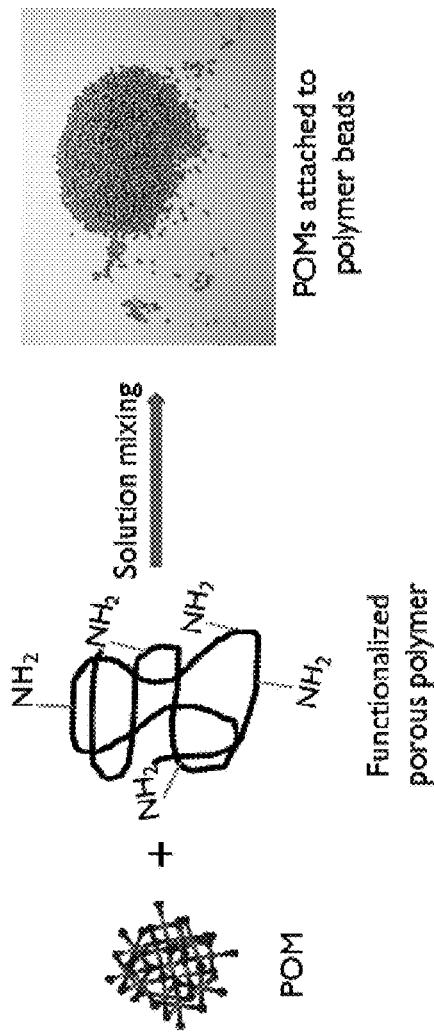
FIG. 1 is a schematic showing ionic attachment of polyoxometalates to a porous polymer.
Figure 2:
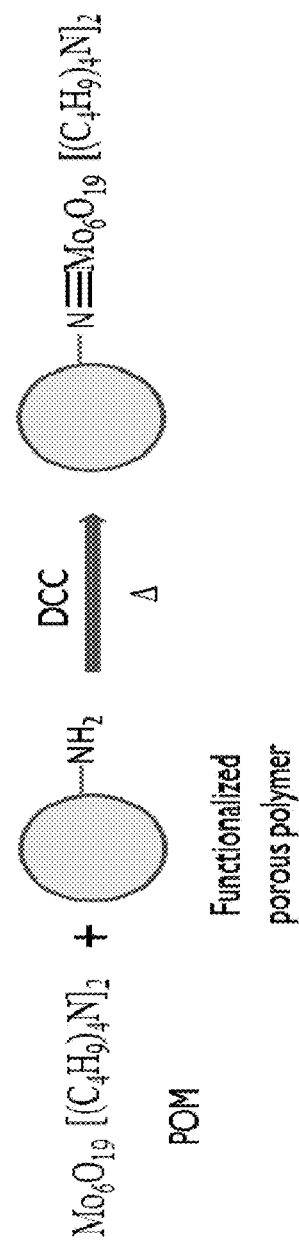
FIG. 2 is a schematic showing covalent attachment of polyoxometalates to a porous polymer.

The present invention provides a general procedure for the attachment of polyoxometalates (POMs) to an amine, carboxylic acid, or ammonium substituted porous polymer such as functionalized polystyrene (see FIG. 1). The attachment can be performed in two ways. First, the POM is dissolved in water or an organic solvent and stirred with the functionalized porous polymer whereby the POM ionically attaches to the amine, carboxylic acid, or ammonium group (See FIG. 1. The color of the beads is green only when the POM is attached to the polymer). Second, the POM and the amine functionalized polymer are heated in the presence of a dehydrating agent (such as N,N'-dicyclohexylcarbodiimide (e.g. DCC)) whereby an imide bond is produced between a metal center in the POM and the amine functionality on the polymer (see FIG. 2). The functionalized polymers that can be used in this case comprise porous polystyrenes (PPS) (available through Sigma-Aldrich), polymers of intrinsic microporosity (Ghanem et al., *Macromolecules*, 43, 5287-

5294 (2010)), conjugated microporous polymers (Dawson et al., *Macromolecules*, 42, 8809-8816 (2009)) and/or any other porous polymer that can be functionalized with an amine, carboxylic acid, or ammonium group.

Figure 3:
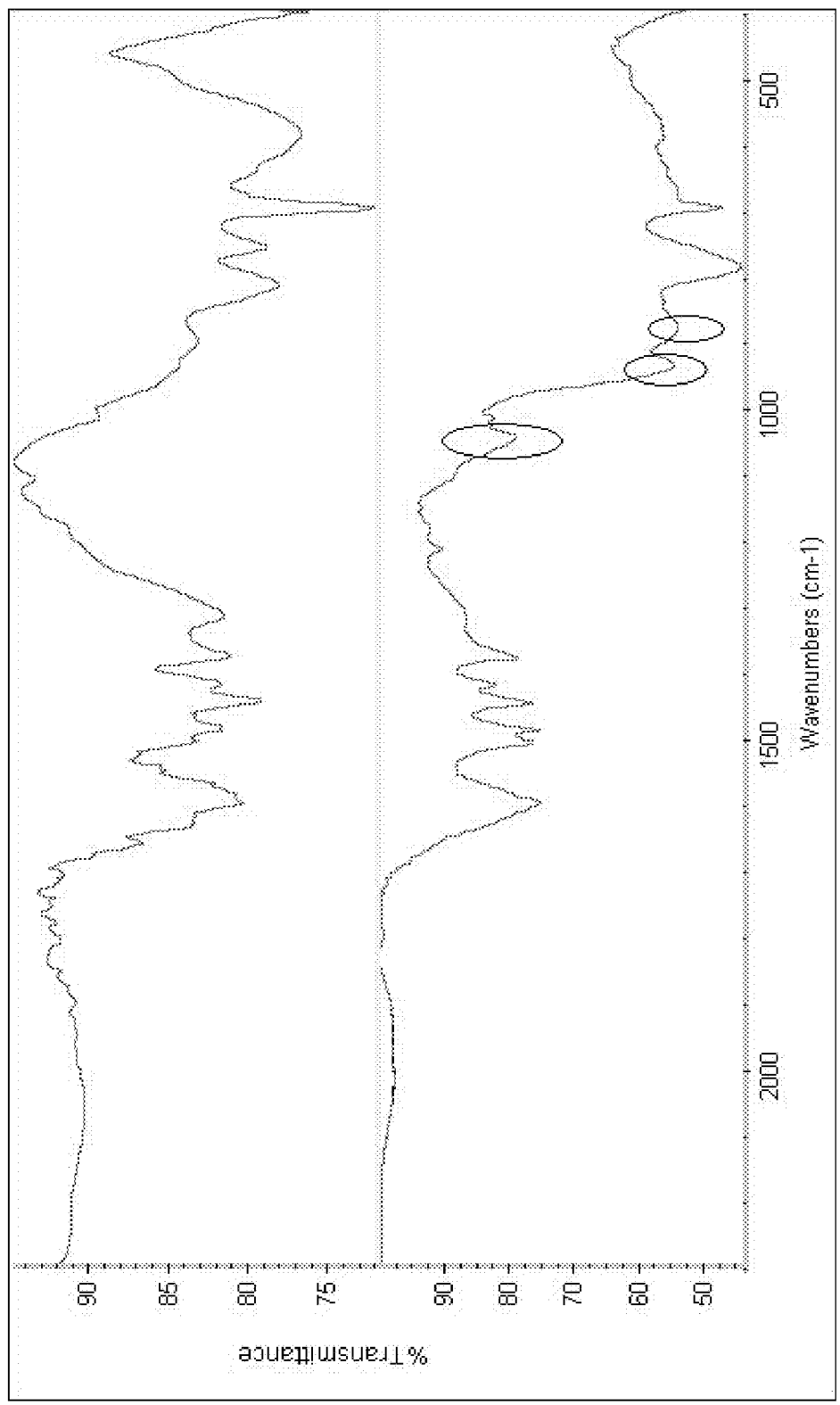
FIG. 3 is FTIR spectra of amine functionalized porous polystyrene beads (top) and $H_5PV_2Mo_{10}O_{40}$ attached to porous polystyrene beads (bottom).

In both the ionic and covalent attachment schemes, the presence of the POM on the polymer was determined by FTIR spectroscopy. FIG. 3 shows the IR region from 2500 to 450 cm$^{-1}$, and three distinct peaks can be seen in the spectra for a sample, where $H_5PV_2Mo_{10}O_{40}$ was attached to PSS beads (bottom), at approximately 1046, 939 and 878 cm$^{-1}$ (circled in bottom plot). This is consistent with the location of the M═O stretches in the parent POM. In addition, the sample took up an appreciable amount of weight (~60%) indicating that the POM was incorporated into the polymer structure.

Figure 4:
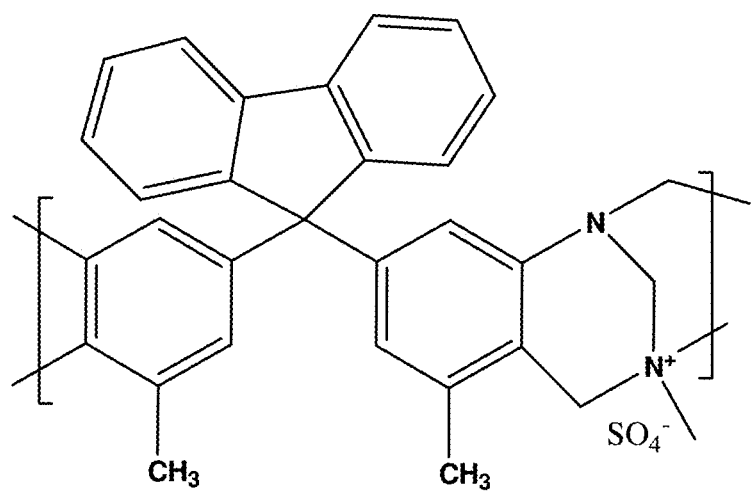
FIG. 4 is the chemical structure for dimethylaminofluorene based PIM (DMAFN$^+$ PIM).

Example 1: Formulation of Polymer of Intrinsic Microporosity (DMAFN$^+$ PIM) and the POM ($K_6CuPW_{11}O_{39}$) Made with $Cu(NO_3)_2$ FIG. 4 shows the chemical structure for dimethylaminofluorene based PIM (DMAFN$^+$ PIM).

$K_7PW_{11}O_{39}$ (0.100 g, 0.0344 mmol) was dissolved in 3 mL of hot water and $Cu(NO_3)_2$ (0.010 g, 0.041 mmol) was added with vigorous stirring. To this solution was added the DMAFN$^+$ PIM (0.500 g) and 2 mL of $CH_3CN$. Gentle heating to 60° C. for 10 min produced a suspension and the mixture was allowed to cool and stirring was continued for an additional 2 h. The solvent was removed and 0.590 g of a grey powder was recovered after vacuum drying at 50° C. The presence of the POM on the PIM was confirmed by observing the P—O, W—O and W—O—W peaks in the FTIR at approximately 1050, 930 and 820, respectively.

Example 2: Formulation of Polymer of Intrinsic Microporosity (DMAFN$^+$ PIM) and the POM ($K_6FePW_{11}O_{39}$) Made with $Fe(NO_3)_3$ $K_7PW_{11}O_{39}$ (0.100 g, 0.0344 mmol) was dissolved in 3 mL of hot water and the DMAFN$^+$ PIM (0.100 g) in 2 mL of $CH_3CN$ was added resulting in a cloudy solution. $Fe(NO_3)_3$ (0.004 g, 0.010 mmol) was added with vigorous stirring and the solution was allowed to stir for 1 h. The solvent was removed and 95 mg of a red powder was recovered after vacuum drying at 50° C. The presence of the POM on the PIM was confirmed by observing the P—O, W—O and W—O—W peaks in the FTIR at approximately 1050, 930 and 820, respectively.

Example 3: Formulation of Polymer of Intrinsic Microporosity (DMAFN$^+$ PIM) and the POM ($H_5PV_2Mo_{10}O_{40}$)

$H_5PV_2Mo_{10}O_{40}$ (0.050 g, 0.029 mmol) was dissolved in 3 mL of $CH_3CN$ and the DMAFN$^+$ PIM (0.250 g) in 2 mL of $CH_3CN$ was added resulting in a cloudy solution. 10 mg of Tetrabutylammonium tribromide (TBABr$_3$) and $Cu(NO_3)_3$ (0.020 g, 0.083 mmol) were added with vigorous stirring and the solution was allowed to stir for 1 h. The solvent was removed and 295 mg of an orange powder was recovered after vacuum drying at 50° C. The presence of the POM on the PIM was confirmed by observing the P—O, Mo—O and Mo—O—Mo peaks in the FTIR at approximately 1046, 939 and 878 cm$^{-1}$, respectively.

Example 4: Formulation of Polymer of Intrinsic Microporosity (DMAFN$^+$ PIM) and the POM ($K_{12}Cu_3(PW_{11}O_{34})_2$) Made with $Cu(NO_3)_2$ $K_{12}Cu_3(PW_{11}O_{34})_2$ (0.050 g, 0.010 mmol) was dissolved in 1 mL of $H_2O$ and the DMAFN$^+$ PIM (0.250 g) in 2 mL of $CH_3CN$ was added resulting in a cloudy solution. The solution was allowed to stir for 1 h, the solvent was removed and 285 mg of a grey powder was recovered after vacuum drying at 50° C. The presence of the POM on the PIM was confirmed by observing the P—O, W—O and W—O—W peaks in the FTIR at approximately 1050, 930 and 820, respectively.

Example 5: Formulation of Polymer of Intrinsic Microporosity (DMAFN$^+$ PIM) and the POM ($K_9(Fe(OH)_2)_3(PW_{11}O_{34})_2$) Made with $Fe(NO_3)_2$ $K_9(Fe(OH)_2)_3(PW_{11}O_{34})_2$ (0.050 g, 0.010 mmol) was dissolved in 1 mL of $H_2O$ and the DMAFN$^+$ PIM (0.250 g) in 2 mL of $CH_3CN$ was added resulting in a cloudy solution. The solution was allowed to stir for 1 h, the solvent was removed and 290 mg of an orange powder was recovered after vacuum drying at 50° C. The presence of the POM on the PIM was confirmed by observing the P—O, W—O and W—O—W peaks in the FTIR at approximately 1050, 930 and 820, respectively.

Example 6: Formulation of Polymer of Intrinsic Microporosity (DMAFN$^+$ PIM) and the POM ($K_{12}Fe_3(PW_{11}O_{34})_2$) Made with $FeBr_3$ $K_{12}Fe_3(PW_{11}O_{34})_2$ (0.050 g, 0.010 mmol) was dissolved in 1 mL of $H_2O$ and the DMAFN$^+$ PIM (0.250 g) in 2 mL of $CH_3CN$ was added resulting in a cloudy solution. The solution was allowed to stir for 1 h, the solvent was removed and 280 mg of an orange powder was recovered after vacuum drying at 50° C. The presence of the POM on the PIM was confirmed by observing the P—O, W—O and W—O—W peaks in the FTIR at approximately 1050, 930 and 820, respectively.

Example 7: Formulation of Polymer of Intrinsic Microporosity (DMAFN$^+$ PIM) and the POM ($K_{12}Cu_3(PW_{11}O_{34})_2$) Made with $Cu(NO_3)_2$ and the POM ($K_{12}Fe_3(PW_{11}O_{34})_2$) Made with $FeBr_3$ $K_{12}Cu_3(PW_{11}O_{34})_2$ (0.050 g, 0.010 mmol) and $K_{12}Fe_3(PW_{11}O_{34})_2$ (0.050 g, 0.010 mmol) were dissolved in 2 mL of $H_2O$ and the DMAFN$^+$ PIM (0.250 g) in 2 mL of $CH_3CN$ was added resulting in a cloudy solution. The was solution allowed to stir for 1 h, the solvent removed and 280 mg of a dark red powder was recovered after vacuum drying at 50° C. The presence of the POMs on the PIM was confirmed by observing the P—O, W—O and W—O—W peaks in the FTIR at approximately 1050, 930 and 820, respectively.

Example 8: Formulation of Porous Amine Functionalized Polystyrene (PAFP) and the POM $H_3PV_2Mo_{10}O_{40}$ Porous Amine Functionalized Polystyrene (PAFP)-(Aminomethyl)polystyrene, macroporous, 30-60 mesh, extent of labeling: 1.5-3.0 mmol/g loading available through Aldrich.

$H_5PV_2Mo_{10}O_{40}$. (239 mg, 0.136 mmol) was dissolved in 2 mL of $CH_3CN$ and the PAFP (326 mg) was added and the resulting suspension (PAFP beads did not dissolve) was stirred for 16 h. The solution gradually turned clear and the PAFP beads were filtered off, washed with $CH_3CN$ and dried to yield 525 mg of green colored PAFP beads. The presence of the POMs on the PIM was confirmed by observing the P—O, Mo—O and Mo—O—Mo peaks in the FTIR at approximately 1046, 939 and 878 $cm^{-1}$ (See FIG. 1).

Example 9: Covalent Attachment of the POM ($[(C_4H_9)N]_2 Mo_6O_{19}$) to the Porous Amine Functionalized Polystyrene (PAFP)

$[(C_4H_9)N]_2 Mo_6O_{19}$ (820 mg, 0.698 mmol) was dissolved in 25 mL of $CH_3CN$ and the PAFP (200 mg was added and the resulting suspension (PAFP beads did not dissolve). N,N'-Dicyclohexylcarbodiimide (140 mg, 0.680 mmol) was added and the suspension heated to 75° C. overnight (16 h). The reaction was filtered and washed with acetone and the coated beads dried to yield 260 mg of material (60 mg POM supported). The presence of the POMs on the PIM was confirmed by observing the P—O, Mo—O and Mo—O—Mo peaks in the FTIR at approximately 1046, 939 and 878 $cm^{-1}$.

Example 10: Formulation of Polymer of Intrinsic Microporosity ($AFN^+$ PIM) and the POM ($H_5PV_2Mo_{10}O_{40}$)

Figure 5:
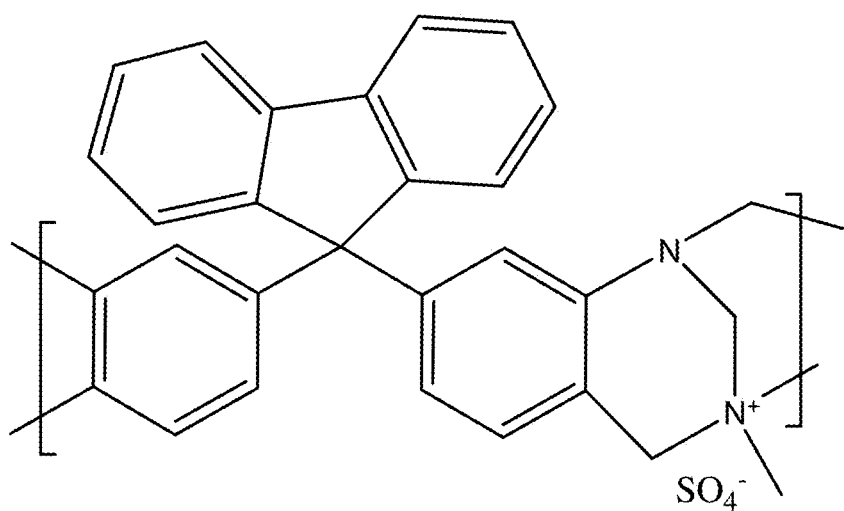
FIG. 5 is the chemical structure for aminofluorene based PIM (AFN$^+$ PIM).

FIG. 5 shows the chemical structure for aminofluorene based PIM ($AFN^+$ PIM).

$H_5PV_2Mo_{10}O_{40}$ (50 mg, 0.028 mmol) was dissolved in 3 mL of $CH_3CN$ and the $AFN^+$ PIM (25 mg) was added with vigorous stirring (the PIM did not dissolve). Following stirring for 16 h the suspension was filtered, washed with $CH_3CN$ and the POM supported PIM recovered (37 mg) as an orange solid. The presence of the POM on the PIM was confirmed by observing the P—O, Mo—O and Mo—O—Mo peaks in the FTIR at approximately 1046, 939 and 878 $cm^{-1}$.

Example 11: Formulation of Polymer of Intrinsic Microporosity (DMAMBN+ PIM) and the POM ($H_5PV_2Mo_{10}O_{40}$)

Figure 6:
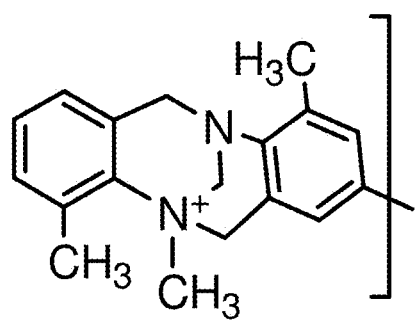
FIG. 6 is the chemical structure for dimethylaminomethylene benzene based PIM (DMAMBN$^+$ PIM).

FIG. 6 shows the chemical structure for dimethylaminomethylene benzene based PIM ($DMAMBN^+$ PIM).

$H_5PV_2Mo_{10}O_{40}$ (100 mg, 0.057 mmol) was dissolved in 3 mL of $H_2O$ and separately the DMAMBN+ PIM (25 mg) was dissolved in 3 mL of hot water. The two solutions were combined with vigorous stirring resulting in the immediate precipitation of the PIM-POM hybrid. The precipitate was filtered, washed with water and $CH_3CN$ and the resulting powder was dried. A green solid (375 mg) was recovered and the presence of the POM on the PIM was confirmed by observing the P—O, Mo—O and Mo—O—Mo peaks in the FTIR at approximately 1046, 939 and 878 $cm^{-1}$.

Example 12: Formulation of Polymer of Intrinsic Microporosity (DMAMBN+ PIM) and the POM ($K_6CuPW_{11}O_{39}$) Made with $Cu(NO_3)_2$ $K_7PW_{11}O_{39}$ (0.100 g, 0.0344 mmol) was dissolved in 3 mL of hot water and $Cu(NO_3)_2$ (0.010 g, 0.041 mmol) was added with vigorous stirring. To this solution was added the DMAMBN+ PIM (0.130 mg) dissolved in 2 mL of $H_2O$. Immediate precipitation of the PIM-POM hybrid was observed. The precipitate was filtered after 10 min of stirring, washed with water and $CH_3CN$ and the resulting powder was dried. An orange solid (271 mg) was recovered and the presence of the POM on the PIM was confirmed by observing the P—O, W—O and W—O—W peaks in the FTIR at approximately 1050, 930 and 820, respectively.

Figure 7:
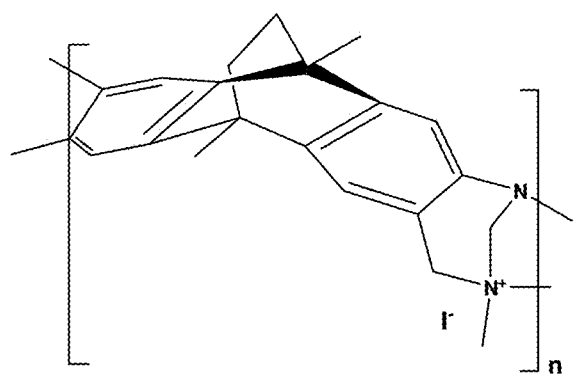
FIG. 7 is the chemical structure for ethanoanthracene based PIM (EATBN$^+$ PIM).

Example 13: Formulation of Polymer of Intrinsic Microporosity ($EATBN^+$ PIM) and the POM ($K_6CuPW_{11}O_{39}$) Made with $Cu(NO_3)_2$ FIG. 7 shows the chemical structure for ethanoanthracene based PIM ($EATBN^+$ PIM).

$K_7PW_{11}O_{39}$ (0.010 g, 0.0034 mmol) was dissolved in 3 mL of hot water and $Cu(NO_3)_2$ (0.001 g, 0.004 mmol) was added with vigorous stirring. To this solution was added the $EATBN^+$ PIM (50 mg) in 1 mL of $CH_3CN$. Gentle heating to 60° C. for 10 min produced a suspension and the mixture was allowed to cool. Stirring was continued for an additional 2 h. The solvent was removed and 58 mg of an orange powder was recovered after vacuum drying at 50° C. The presence of the POM on the PIM was confirmed by observing the P—O, W—O and W—O—W peaks in the FTIR at approximately 1050, 930 and 820, respectively.

Example 14: Formulation of Polymer of Intrinsic Microporosity ($EATBN^+$ PIM) and the POM ($K_6FePW_{11}O_{39}$) Made with $Fe(NO_3)_3$ $K_7FePW_{11}O_{39}$ (0.025 g, 0.0085 mmol) was dissolved in 3 mL of hot water and the $EATBN^+$ PIM (0.100 g) in 2 mL of $CH_3CN$ was added resulting in a cloudy solution. $Fe(NO_3)_3$ (0.004 g, 0.010 mmol) was then added with vigorous stirring and the resulting solution was allowed to stir for 1 h. The solvent was removed and 115 mg of a red powder was recovered after vacuum drying at 50° C. The presence of the POM on the PIM was confirmed by observing the P—O, W—O and W—O—W peaks in the FTIR at approximately 1050, 930 and 820, respectively.

Example 15: Formulation of Polymer of Intrinsic Microporosity ($EATBN^+$ PIM) and the POM ($K_9(Fe(OH)_2)_3(PW_{11}O_{34})_2$) Made with $Fe(NO_3)_2$ $K_9(Fe(OH)_2)_3(PW_{11}O_{34})_2$ (0.070 g, 0.014 mmol) was dissolved in 3 mL of hot water and to this solution was added the $EATBN^+$ PIM (65 mg) in 1 mL of $CH_3CN$. Gentle heating to 60° C. for 10 min produced a suspension and the mixture was allowed to cool. Stirring was continued for an additional 2 h. The solvent was removed and 90 mg of an orange powder was recovered after vacuum drying at 50° C. The presence of the POM on the PIM was confirmed by observing the P—O, W—O and W—O—W peaks in the FTIR at approximately 1050, 930 and 820, respectively.

Example 16: Formulation of Polymer of Intrinsic Microporosity and the POM ($H_5PV_2Mo_{10}O_{40}$)

$H_5PV_2Mo_{10}O_{40}$ (50 mg, 0.028 mmol) was dissolved in 3 mL of $CH_3CN$ and the $EATBN^+$ PIM (35 mg) was added with vigorous stirring (the PIM did not dissolve). Following stirring for 16 h, the suspension was filtered, washed with $CH_3CN$ and the POM supported PIM was recovered (48 mg) as an orange solid. The presence of the POM on the PIM was confirmed by observing the P—O, Mo—O and Mo—O—Mo peaks in the FTIR at approximately 1046, 939 and 878 $cm^{-1}$.

Example 17: Formulation of Polymer of Intrinsic Microporosity (C-PIM-1) and the POM ($H_5PV_2Mo_{10}O_{40}$)

Figure 8:
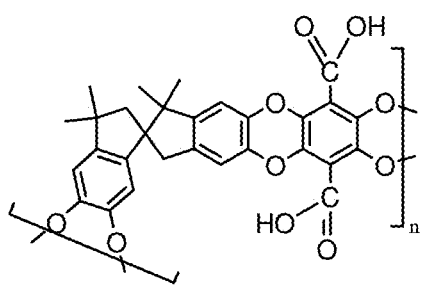
FIG. 8 is the chemical structure for carboxylated PIM-1 (C-PIM-1).

FIG. 8 shows the chemical structure for carboxylated PIM-1 (C-PIM-1).

$H_5PV_2Mo_{10}O_{40}$ (50 mg, 0.028 mmol) was dissolved in 3 mL of $CH_3CN$ and the C-PIM-1 (42 mg) (carboxylic acid containing PIM) was added with vigorous stirring (the PIM did not dissolve). Following stirring for 16 h, the suspension was filtered, washed with $CH_3CN$ and the POM supported PIM was recovered (53 mg) as an orange solid. The presence of the POM on the PIM was confirmed by observing the P—O, Mo—O and Mo—O—Mo peaks in the FTIR at approximately 1046, 939 and 878 $cm^{-1}$.

Example 18: Catalytic Oxidation of 2-Chloroethylethylsulfide (CEES) to 2-Chloroethylethylsulfoxide (CEESO) Using DMAFN$^+$ PIM:$K_5CuPW_{11}O_{39}$ POM Mixture 49 mg, 0.0037 mmol POM, of Example 1 was weighed into a 20 mL scintillation vial and 2 mL of anhydrous $CH_3CN$ was added. To the suspension was added 10 mg of tetrabutylammonium nitrate ($TBANO_3$) and 10 mg of tetrabutylammonium bromide (TBABr) and the color of the reaction mixture turned orange. After 10 min of vigorous stirring CEES (0.1 mL, 0.862 mmol) was added and the vial capped with a septa with a needle to ensure sufficient air availability. The reaction was monitored for 22 h with the results listed in Table 1.

TABLE 1

Results for Oxidation reaction of Example 18.

| POM (mol) | % conversion | Time (h) | TOF | TON |
|---|---|---|---|---|
| 0.000003 | 47 | 1 | 120 | 120 |
| 0.000003 | 52 | 4 | 33 | 132 |
| 0.000003 | 55 | 22 | 6 | 140 |

Example 19: Catalytic Oxidation of 2-Chloroethylethylsulfide (CEES) to 2-Chloroethylethylsulfoxide (CEESO) Using DMAFN$^+$ PIM:$K_5CuPW_{11}O_{39}$ POM Mixture and $Cu(OTf)_2$/$Cu(NO_3)_2$ 49 mg, 0.002 mmol POM, of Example 1 was weighed into a 20 mL scintillation vial and 2 mL of anhydrous $CH_3CN$ was added. To the suspension was added 6 mg of tetrabutylammonium nitrate ($TBANO_3$) and 6 mg of tetrabutylammonium bromide (TBABr) and the color of the reaction mixture turned orange. Next, a 0.5 mL aliquot of a 15 mM $Cu(NO_3)_2$:22.5 mM $Cu(OTf)_2$ solution in $CH_3CN$ was added and the mixture turned yellow. After 10 min of vigorous stirring CEES (0.1 mL, 0.862 mmol) was added and the vial capped with a septa with a needle to ensure sufficient air availability. The reaction was monitored for 100 h with the results listed in Table 2.

TABLE 2

Results for oxidation reaction of Example 19.

| POM (mol) | % conversion | Time (h) | TOF | TON |
|---|---|---|---|---|
| 0.0000016 | 48 | 1 | 229 | 229 |
| 0.0000016 | 60 | 22.5 | 13 | 287 |
| 0.0000016 | 68 | 100 | 3 | 325 |

Example 20: Catalytic Oxidation of 2-Chloroethylethylsulfide (CEES) to 2-Chloroethylethylsulfoxide (CEESO) Using DMAFN$^+$ PIM:$K_5CuPW_{11}O_{39}$ POM Mixture with Low Catalyst Loading 6 mg, 0.00045 mmol POM, of Example 1 was weighed into a 20 mL scintillation vial and 2 mL of anhydrous $CH_3CN$ was added. To the suspension was added 6 mg of tetrabutylammonium nitrate ($TBANO_3$) and 6 mg of tetrabutylammonium bromide (TBABr) and the color of the reaction mixture turned orange. After 1 min of vigorous stirring CEES (0.1 mL, 0.862 mmol) was added and the vial capped with a septa with a needle to ensure sufficient air availability. The reaction was monitored for 96 h with the results listed in Table 3.

TABLE 3

Results for oxidation reaction of Example 20.

| POM (mol) | % conversion | Time (h) | TOF | TON |
|---|---|---|---|---|
| 0.00000036 | 7 | 1 | 149 | 149 |
| 0.00000036 | 11 | 18.5 | 13 | 234 |
| 0.00000036 | 18 | 96 | 4 | 382 |

Example 21: Catalytic Oxidation of 2-Chloroethylethylsulfide (CEES) to 2-Chloroethylethylsulfoxide (CEESO) Using DMAFN$^+$ PIM:$K_5FePW_{11}O_{39}$ POM Mixture 22 mg, 0.0018 mmol POM, of Example 5 was weighed into a 20 mL scintillation vial and 2 mL of anhydrous $CH_3CN$ was added. To the suspension was added 8 mg of tetrabutylammonium nitrate ($TBANO_3$) and 9 mg of tetrabutylammonium bromide (TBABr). After 10 min of vigorous stirring CEES (0.1 mL, 0.862 mmol) was added and the vial capped with a septa with a needle to ensure sufficient air availability. The reaction was monitored for 22 h with the results listed in Table 4.

TABLE 4

Results for Oxidation reaction of Example 21.

| POM (mol) | % conversion | Time (h) | TOF | TON |
|---|---|---|---|---|
| 0.0000018 | 20 | 1 | 85 | 85 |
| 0.0000018 | 25 | 17 | 6 | 106 |
| 0.0000018 | 26 | 22 | 5 | 110 |

Example 22: Catalytic Oxidation of 2-Chloroethylethylsulfide (CEES) to 2-Chloroethylethylsulfoxide (CEESO) Using a DMAFN$^+$ PIM:$K_5CuPW_{11}O_{39}$ POM and a DMAFN$^+$ PIM:$K_5FePW_{11}O_{39}$ POM Mixture 18 mg, 0.0014 mmol POM, Example 1 and (20 mg, 0.0016 mmol POM) of Example 5 was weighed into a 20 mL scintillation vial and 2 mL of anhydrous $CH_3CN$ was added. To the suspension was added 10 mg of tetrabutylammonium nitrate ($TBANO_3$) and 10 mg of tetrabutylammonium bromide (TBABr). After 10 min of vigorous stirring CEES (0.1 mL, 0.862 mmol) was added and the vial capped with a septa with a needle to ensure sufficient air availability. The reaction was monitored for 101 h with the results listed in Table 5.

TABLE 5

Results for Oxidation reaction of Example 22.

| POM (mol) | % conversion | Time (h) | TOF | TON |
|---|---|---|---|---|
| 0.0000026 | 42 | 1 | 123 | 123 |
| 0.0000026 | 48 | 23.5 | 6 | 141 |
| 0.0000026 | 54 | 101 | 2 | 159 |

Example 23: Catalytic Oxidation of 2-Chloroethylethylsulfide (CEES) to 2-Chloroethylethylsulfoxide (CEESO) Using a DMAFN$^+$ PIM: $K_9Cu_3(PW_{11}O_{34})_2$ POM 32 mg, 0.0011 mmol POM, Example 1 and (20 mg, 0.0016 mmol POM) of Example 5 was weighed into a 20 mL scintillation vial and 2 mL of anhydrous $CH_3CN$ was added. To the suspension was added 9 mg of tetrabutylammonium nitrate ($TBANO_3$) and 9 mg of tetrabutylammonium bromide (TBABr). After 10 min of vigorous stirring CEES (0.1 mL, 0.862 mmol) was added and the vial capped with a septa with a needle to ensure sufficient air availability. The reaction was monitored for 76 h with the results listed in Table 6.

TABLE 6

Results for Oxidation reaction of Example 23.

| POM (mol) | % conversion | Time (h) | TOF | TON |
|---|---|---|---|---|
| 0.00000109 | 21 | 2 | 74 | 147 |
| 0.00000109 |  | 76 | 0 | 0 |

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," is not to be construed as limiting the element to the singular.

What is claimed as new and desired to be protected by Letters Patent of the United States is:

1. A composition for the destruction of chemical warfare agents and toxic industrial chemicals, comprising:
    a polyoxometalate (POM) attached to an amine, carboxylic acid, or ammonium substituted porous polymer article, wherein the POM has the formula $[K_6XPW_{11}O_{39}]$, wherein X is selected from Cu and Fe.

2. A composition for the destruction of chemical warfare agents and toxic industrial chemicals, comprising:
    a polyoxometalate (POM) attached to an amine, carboxylic acid, or ammonium substituted porous polymer article, wherein the POM has the formula $[K_{12}X_3(PW_{11}O_{34})_2]$, wherein X is selected from Cu and Fe.

3. A composition for the destruction of chemical warfare agents and toxic industrial chemicals, comprising:
    a polyoxometalate (POM) attached to an amine, carboxylic acid, or ammonium substituted porous polymer article, wherein the POM has the formula $[K_9(Fe(OH)_2)_3(PW_{11}O_{34})_2]$.

4. A composition for the destruction of chemical warfare agents and toxic industrial chemicals, comprising:
    a polyoxometalate (POM) attached to an amine, carboxylic acid, or ammonium substituted porous polymer article, wherein the POM has the formula $[((C_4H_9)N)_2Mo_6O_{19}]$.

5. The composition of claim 1, wherein the polymer is a porous polystyrene, a polymer of intrinsic microporosity, or a conjugated microporous polymer.

6. The composition of claim 2, wherein the polymer is a porous polystyrene, a polymer of intrinsic microporosity, or a conjugated microporous polymer.

7. The composition of claim 3, wherein the polymer is a porous polystyrene, a polymer of intrinsic microporosity, or a conjugated microporous polymer.

8. The composition of claim 4, wherein the polymer is a porous polystyrene, a polymer of intrinsic microporosity, or a conjugated microporous polymer.

* * * * *